Nov. 21, 1967  T. TEMPLE  3,354,381
D.C. TO A.C. INVERTER CIRCUIT
Filed Jan. 9, 1963
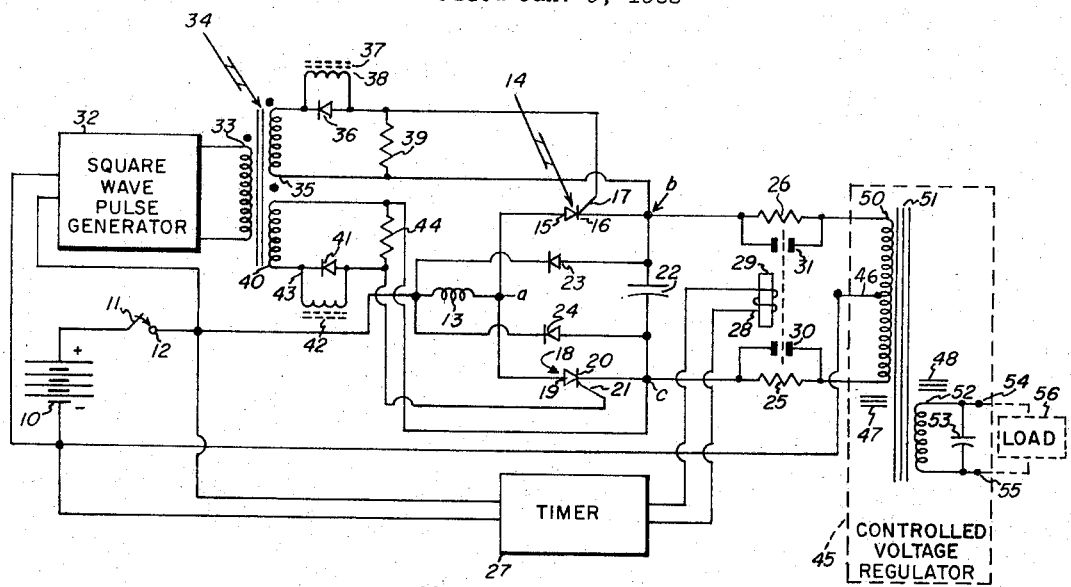
FIG. 1
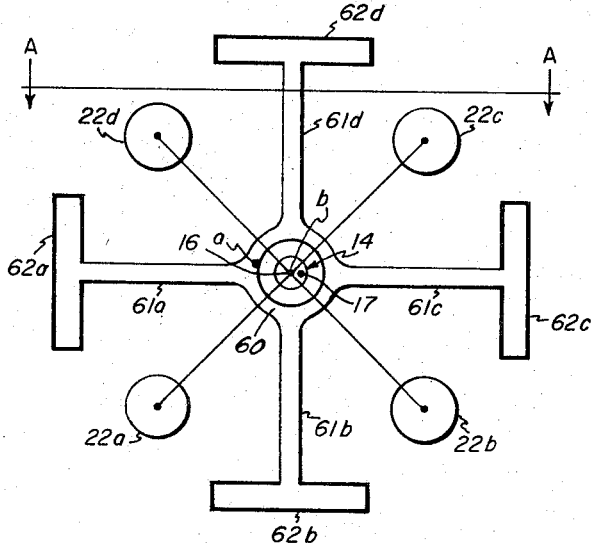
FIG. 2
FIG. 3
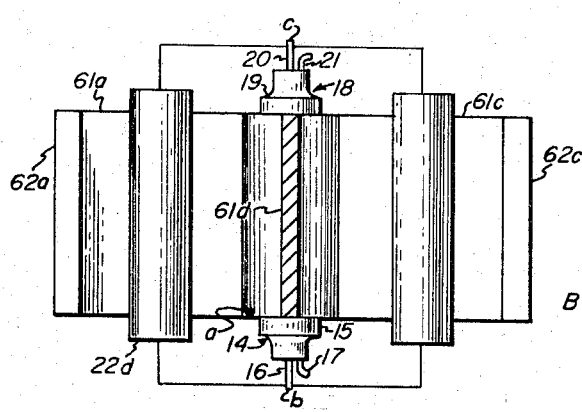
INVENTOR
TREVOR TEMPLE
BY Herbert W. Arnold
ATTORNEY United States Patent Office 3,354,381
Patented Nov. 21, 1967

3,354,381
D.C. TO A.C. INVERTER CIRCUIT
Trevor Temple, Kingston, N.H., assignor to Raytheon Company, Lexington, Mass., a corporation of Delaware
Filed Jan. 9, 1963, Ser. No. 250,340
12 Claims. (Cl. 321—45)

The present invention relates to an inverter for providing a source of alternating current power from a direct current source and more particularly to an inverter which utilizes controlled rectifiers to provide a reliable source of standby alternating current power.

One of the problems incident to relatively high powered inverter circuits, for example, over two hundred watts, to be used in applications requiring a source of standby A.C. power in the event of a failure of the primary source of power, is the difficulty of providing a device with a high degree of reliability. In the past it has been difficult to achieve acceptable reliability figures of merit using presently available controlled rectifier inverter circuits. The presence of residual flux in the core of the output transformer causes current surges which destroy components upon turn-on. Additionally, failure of presently available inverters to reliably commutate upon turn-on has caused additional difficulties. Commutation is defined as turning off a controlled rectifier or switch at the end of its required conducting period. Furthermore, difficulties have ensued in providing means for rapidly and reliably turning off inverter switches.

Therefore, it is an object of this invention to provide a new and improved inverter system which provides reliable operation by insuring that the inverter will at all times commutate.

It is an additional object to provide an inverter which purges itself of residual flux.

It is a further object to provide an inverter which provides means for rapidly and reliably turning off inverter switches.

In accordance with the inverter system of this invention a plurality of controlled rectifiers, which could be of a solid state material such as silicon, operates as "on" and "off" switches. A control voltage regulator is used as an output transformer for producing substantially a sine wave output in response to the "on" and "off" switching of controlled rectifiers. Additionally, the inverter includes a wave generator which preferably provides a square wave chopped positive cycle wave front to the controlled elements or gates of the controlled rectifiers. Furthermore, resistors are coupled in circuit with the controlled rectifiers and the transformer to limit peak currents during turn-on, to provide a commutating voltage regardless of the state of the residual magnetic flux in the primary magnetic core material of output transformer, and to provide a means for purging the residual flux from the core material. Additionally, a commutating capacitor and the controlled rectifier switches are arranged in a coaxial manner so as to reduce the inductance present in the inverter system and to insure rapid and reliable commutation of the controlled rectifiers.

Other objectives and features of this invention will become apparent from the following description taken in connection with the following drawings wherein:

FIG. 1 is a circuit diagram of an inverter system according to the invention;

FIG. 2 is a side view of the coaxial arrangement of the controlled rectifiers and the commutating capacitors and;

FIG. 3 is a sectional view taken along lines A—A of FIG. 2.

Referring now to FIG. 1 which shows a circuit diagram of the inverter system according to the invention, a source of D.C. power 10, for example, a lead acid type battery, is shown coupled through a switch 11 having a contact 12, to the inverter circuit. There is shown an inductor 13 which provides A.C. isolation of the commutating current connected at one end of terminal 12 of switch 11. A first controlled rectifier switch 14 is shown having an anode 15, cathode 16 and gate 17. Anode 15 is shown connected to the other end of inductor 13, which henceforth will be designated as terminal point a. Additionally, a second controlled rectifier switch 18 having an anode 19, cathode 20 and a gate 21 is illustrated having its anode 19 connected to terminal point a. There is shown a commutating capacitor 22 coupled at one end to cathode 16, which henceforth will be designated as terminal point b and coupled at its other end to cathode 20 of controlled rectifier 18, which henceforth will be designated as terminal point c. Additionally, there is shown a pair of reactive load current feedback diodes 23 and 24. Diode 23 is connected at one end to switch contact terminal 12 and at its other end to terminal point b, and diode 23 is connected to switch contact terminal 12 and at its other end to terminal point c.

A resistor 25 is illustrated being connected at one end to terminal point c so as to provide a means for obtaining current surge protection, to provide means for insuring the charging up of commutating capacitor 22, and to provide means for purging the inverter system of residual flux. Additionally, there is shown a resistor 26 connected at one end to terminal point b having the same functions as described in relation to resistor 25. A timer 27 of a well known variety is shown for providing a timed actuation signal through winding 28 on core 29 to short shunting contacts 30 and 31 coupled across resistor 25 and 26, respectively, after sufficient time has elapsed to allow the inverter system to purge itself of the residual flux. This shorting of resistors also permits the output transformer to supply full voltage to a load.

A square wave pulse generator 32 is shown coupled across D.C. source 10 and provides a source of square wave actuating signals to turn on controlled rectifier switches 14 and 18. Primary winding 33 on core 34 is shown coupled to square wave pulse generator 32 to transfer the square pulses through secondary windings 35 and 40 on core 34 to gates 17 and 21 of controlled rectifier switches 14 and 18, respectively. Diode 36 is shown coupled to one end of secondary winding 35 and at its other end to gate 17 of controlled rectifier switch 14. A delay winding 38 wound on core 37, preferably constructed of a square loop magnetic core material is shown connected across diode 36 and is utilized to chop off a portion of the leading edge of the positive cycle square wave signal provided at secondary winding 35. A stabilizing resistor 39 is shown coupled between gate 17 and terminal point b so as to provide a constant voltage drop prior to turn-on of controlled rectifier switch 14. A diode 41 is shown coupled at one end to secondary winding 40 and at its other end to gate 21 of switch 18. A delay winding 43 on core 42 chops off a portion of the leading edge of the positive signal provided by the square wave pulse generator signal to the undotted end of secondary winding 40 and, is shown coupled across diode 41. A stabilizing dropping resistor 44 is shown coupled between gate 21 and terminal point c and performs a stabilizing function like resistor 39.

A controlled voltage regulator 45 used as an output transformer is shown having a primary winding 50 on magnetic core 51. The primary winding 50 is shown with a center tap 46 coupled to the negative side of power source 10. The theory of operation of controlled voltage regulators, which term is synonymous for the purposes of this invention with either static voltage regulators or voltage stabilizers, is taught in the publication "Electronic Transformers and Circuits" by Reuben Lee, published by John Wiley and Sons, Inc., Second Edition (printed February 1958, on pages 252 through 254. A secondary winding 52 on core 51 is shown having a shunt capacitor 53, the combination being utilized to provide substantially a sine wave output in response to the "on" and "off" switching of controlled rectifiers 14 and 18. There is also shown a pair of magnetic shunts 47 and 48 for separating the primary winding from the secondary in a well known manner. A pair of output terminals 54 and 55 are shown at either end of secondary winding 52 and capacitor 53. Furthermore, there is shown a load 56, which could be of the resistive, inductive or capacitative type or any combination thereof coupled across output terminals 54 and 55.

Considering now the operation of the circuit of FIG. 1, switch 11 is manually closed. Switch 11 is normally closed in the event of a power failure so as to continue to supply A.C. power and provide continuous operation of a load device. Switch 11 could be closed as in this situation manually, although it could be adapted to operate as a relay so as to sense and be actuated in response to the loss of power from a primary source of A.C. energy. Upon closure of switch 11, D.C. power from battery 10 is applied between tap 46 of primary winding 50 and one end of inductor 13. The closure of switch 11 also provides D.C. energy to square wave pulse generator 32 which then initiates a continuous train of square wave output pulses and transmits them to primary winding 33 on isolation transformer core 34. Assume that the square wave pulse generator 32 upon closure of switch 11 provides a square wave signal in the positive direction through the dotted end of primary winding 33, thereby producing a positive signal at the dotted ends of secondary windings 35 and 40. The positive signal in secondary winding 35 passes through a delay winding 38 which, as noted previously, chops off a portion of the leading edge of the positive going pulse before permitting the remainder of the pulse to be applied across resistor 39 and the gate 17 of controlled rectifier 14. The delay winding operates such that a positive signal is impeded for a period of time sufficient to reverse saturate core 37, and after core 37 reverse saturates then provide a positive going turn-on signal to gate 17 of controlled rectifier 14. This positive signal renders controlled rectifier 14 conductive and thus causes a voltage of a magnitude approximately equal to the magnitude of the voltage source 10 to appear across resistor 26 and one-half of primary winding 50 coupled to resistor 26. Assume for purposes of explanation that a residual flux has been originally present in the magnetic core material of core 51, and thus the primary magnetic circuit was operating in the saturation region of the magnetization curve. If this were the case, one-half of the primary 50 could not support the voltage provided by the voltage source 10 and therefore in the absence of resistor 26, a surge of current would be produced, only limited in magnitude by the resistance of the controlled rectifier, and would undoubtedly cause failure of controlled rectifier 14. Additionally, if resistor 26 were not present, commutating capacitor 22 could not initially charge up to approximately the supply voltage 10 so as to provide for commutation of the inverter circuit controlled rectifier switches 14 and 18. Therefore, it is seen that the use of resistor 26 coupled between cathode 16 and primary winding 50 permits the capacitor to charge up to approximately the supply voltage and at the same time prevents current surges in the event that the magnetic core material contains an excess of residual flux upon closure of switch 11.

The next one-half cycle of the output provided by square wave pulse generator 32 provides a negative portion of a square wave pulse at the dotted ends of secondary windings 35 and 40. The negative pulse is applied to gate 17 of controlled rectifier 14 prior to the presence of a positive pulse from secondary winding 40 being applied to gate 21 of controlled rectifier 18. This time lag or delay is provided in order to insure that gate 17 will have the negative pulse applied to it prior to the turning off of controlled rectifier 14. The application of the negative pulse prior to initiation of turn-off, reduces turn-off time by initiating recombination of the excess holes and electrons in the controlled rectifier material. Additionally, the negative signal at the dotted end of secondary 35 causes a voltage drop across diode 36 which is used to reverse saturate core 37 in order that the next positive pulse will be chopped.

The presence of the positive pulse at the dotted end of secondary 40 is delayed in a similar manner as described in relation to core 37 and applied through delay winding 43 to gate 21 so as to turn-on controlled rectifier 18. The turning on of controlled rectifier 18 applies a voltage approximately equal to the magnitude of the voltage source 10 between tap 46 on primary winding 50 and resistor 25. This application of the voltage across primary winding 50 and resistor 25 now reverses the current flow through commutating capacitor 22 and charges commutating capacitor 22 to a positive potential at its end which is coupled to terminal point $c$. This reversal of current through commutation capacitor 22 turns off or causes controlled rectifier 14 to become nonconducting in a rapid manner due to the small time constant of the discharge circuit which comprises capacitor 22, controlled rectifier 14 and controlled rectifier 18. The application of square wave pulses by pulse generator 32 is continued in the manner previously described in order to provide for continuous operation of this inverter.

Timer 27 is coupled into the inverter system and is energized by the closure of switch 11, which permits D.C. power to be applied from voltage source 10. After a period of time, timer 27 applies the D.C. from the voltage source 10 to winding 28 on core 29 and closes the contacts 30 and 31 which shunt resistors 25 and 26, respectively. This period of time is determined such that the residual flux initially present in the magnetic core of the primary magnetic circuit will exponentially reduce itself to a tolerable level or substantially a zero residual flux level, so that resistors 25 and 26 will no longer be required for satisfactory operation of the inverter. While the resistors are in the inverter circuit the residual flux present in the primary core material is purged from the primary of the controlled voltage regulator by causing unequal currents to flow through resistor 25 and 26. These unequal currents are a function of the nonlinearity of the B-H curve of the magnetic core material. Therefore, unequal voltage drops will appear across the primary winding 50 of controlled voltage regulator 45. Thus, flux changes produced by the switching of controlled rectifiers 14 and 18, will be unequal and thereby reduce the residual flux to a tolerable or acceptable level. Additionally, the shorting out of resistors 25 and 26 permits the output voltage to increase to its full operating level.

The controlled voltage regulator 45, in response to the controlled rectifier switches 14 and 18, is provided through its primary winding 50 with an output voltage, which is then applied by transformer action across the secondary circuit, comprising secondary winding 52 and capacitor 53. This combination converts a substantially square wave output signal produced by the switching of controlled rectifier switches 14 and 18 to substantially a sine wave output at output terminals 54 and 55. Thus, a standby source of A.C. power is available to load 56.

In situations where low D.C. voltage inputs are applied to inverters to produce A.C. high power outputs, a new order of low inductance circuitry is important to ensure commutation. To obtain this new order of low inductance circuitry, a coaxial arrangement of a commutation capacitor comprising a plurality of parallel connected capacitors and a plurality of controlled rectifier switches is shown in FIGS. 2 and 3 with terminal points $a$, $b$, and $c$, corresponding to terminal points $a$, $b$, and $c$ of FIG. 1.

Referring now to FIGS. 2 and 3, there is shown a side view and a sectional view along section line A—A of FIG. 2 of a coaxial arrangement of a plurality of controlled rectifiers and a plurality of capacitors arranged to function as a combination heat sink and a low inductance circuit. In particular capacitor 22 of FIG. 1 may consist of four concentrically arranged capacitors with a plurality of magnetic isolating shields or arms to isolate the magnetic fields produced by these capacitors.

FIGS. 2 and 3 show a cylindrical mounting block of solid material 60, preferably having both high electrical and high heat conductivity, such as copper or aluminum. A plurality of metallic magnetic isolation heat dissapative arms 61a, 61b, 61c and 61d extend from the block and may be integral therewith. The arms 61a, 61b, 61c and 61d are shown with cooling metallic flanges or fins 62a, 62b, 62c and 62d. Additionally, there is shown controlled rectifier 14 having its anode 15 tap mounted on and electrically connected to block 60 and its cathode 16 and gate contact 17 physically isolated from anode 15. There is shown controlled rectifier 18 having its anode 19 tap mounted and electrically connected to on the other end of block 60 with its cathode contact 20 and its gate contact 21 physically isolated from its anode 19. A plurality of capacitors 22a, 22b, 22c and 22d, preferably of the extended foil type are shown positioned in a coaxial manner surrounding block 60 and physically separated from each other by magnet isolation arms 61a, 61b, 61c and 61d, respectively. The analogy to a coaxial line is drawn on whereby the metal block can be considered as a center conductor and the effective outer cylinder can be considered as formed by the surrounding parallel connected capacitor. Additionally, there is shown the physical parallel connection of capacitors 22a, 22b, 22c and 22d at terminal points *b* and *c*. Terminal point *a* is designated as point *a* on block 60, and is a common electrical connection of anodes 15 and 19 of controlled rectifiers 14 and 18, respectively.

This coaxial arrangement of capacitors 22a, 22b, 22c and 22d form commutating capacitor 22, and provides a means for reducing the inductance of the commutating circuit of the inverter, while at the same time providing an increased coolant area for the controlled rectifiers. The cooling arms 61a, 61b, 61c and 61d and the fins 62a, 62b, 62c and 62d intersect the magnetic field surrounding each of the capacitors 22a, 22b, 22c and 22d in the manner of shorted turns so as to materially reduce the effective inductance of the commutating capacitor. Additionally, it is to be noted that although an embodiment has been disclosed which teaches the use of arms and fins to reduce the inductance of the commutating capacitor, the capacitors 22a, 22b, 22c and 22d may be arranged in a coaxial manner without the use of magnetic isolating arms and fins as shown in FIGS. 2 and 3. This arrangement appreciably reduces the inductance of the commutating capacitors due to bucking magnetic fields surrounding the capacitors, although not as effectively as the embodiments of FIGS. 2 and 3. This decrease in the inductance of the commutating capacitor is desirable in systems which operate at low voltage with high current so as to enable inverter circuit controlled rectifier switches to rapidly and reliably commutate.

While it will be understood that the circuit specifically may vary according to any particular application, such as higher output powers, the following circuit specifications are included for the circuit of FIG. 1 by example only:

Voltage source 10: 48 volts
Commutating capacitor 22: 20 microfarads
Resistors 25 and 26: 1 ohm, 25 watt
Controlled rectifiers 14 and 18: 25 amperes rms GE–C40H
Diodes 36 and 41: IN1695
Resistors 39 and 40: 33 ohms, 1 watt Output power: 500 watts
Output voltage: 115 volts
Output frequency: 60 c.p.s.

Other embodiments of the invention utilizing the techniques as described with relation to the circuit shown in FIG. 1 could be constructed in a bridge inverter circuit form. In lieu of the pair of resistors 25 and 26 shown in FIG. 1 a single resistor could be used in circuit with a commutating capacitor to form the center leg of a bridge circuit to provide the new and improved results as obtained by the circuit of FIG. 1. Accordingly, it is desired that this invention not be limited except as defined by the appended claims.

What is claimed is:

1. An inverter comprising a first and second solid state controlled rectifiers, means coupled to said rectifiers for alternately initiating conduction of said first and second controlled rectifiers, means connected across said rectifiers for providing for commutation of said first and second controlled rectifiers, output means responsive to the conduction of said first and second controlled rectifiers, means for applying a reverse gate potential to said first and second controlled rectifiers prior to the commutation of said first and second controlled rectifiers whereby recombination of excess holes and electrons in said rectifiers is started prior to commutation, means coupled between said output means and the outputs of said rectifiers for purging any residual flux component, and means coupled to said means for initiating conduction of each of said rectifiers for shunting said means for purging after said residual flux component reaches a particular level whereby full voltage may be obtained at said output means.

2. An inverter comprising a plurality of controlled rectifiers, means coupled to said rectifiers for alternately initiating conduction of each of said controlled rectifiers, means connected across said rectifiers for providing for commutation of said controlled rectifiers, output means coupled to the output of said rectifiers, said output means having a magnetic core whose flux density is responsive to the conduction of said controlled rectifiers, means coupled between said output means and the outputs of said rectifiers for purging a residual flux component of said flux density, and means coupled to said means for initiating conduction of each of said rectifiers for shunting said means for purging after sufficient time has elasped to allow the inverter circuit to purge itself of residual flux, thereby allowing full voltage to be applied to said output means.

3. An inverter comprising a plurality of controlled rectifiers, means coupled to said rectifiers for alternately initiating conduction of each of said controlled rectifiers, means connected across said rectifiers for providing for commutation of said controlled rectifiers, output means coupled to the output of said rectifiers, said output means having a magnetic core whose flux density has a residual component which is responsive to the conduction of said controlled rectifiers, means coupled between said output means and the outputs of said rectifiers for purging said residual flux component, and means coupled to said means for initiating conduction of each of said rectifiers for shunting said means for purging after said residual flux component reaches a particular level whereby full voltage may be obtained at said output means.

4. An inverter comprising a plurality of controlled rectifiers, means coupled to said rectifiers for alternately initiating conduction of each of said controlled rectifiers, capacitive means connected across said rectifiers for providing for commutation of said controlled rectifiers, resistance means connected to the output of said rectifiers for insuring commutation of said controlled rectifiers, output means connected to said resistance means, said output means responsive to the conduction of said controlled rectifiers, and means for decreasing the inductance present in said inverter comprising means for coaxially arranging said capacitive means and said plurality of controlled rectifiers.

5. An inverter as claimed in claim 4 wherein said means for coaxially arranging comprises a material having both high electrical and high heat conductivities.

6. An inverter comprising a plurality of controlled rectifiers; means coupled to said rectifiers for alternately initiating conduction of each of said controlled rectifiers; capacitive means coupled across said rectifiers for providing for commutation of said controlled rectifiers; resistance means connected to the output of said rectifiers for insuring commutation of said controlled rectifiers; output means coupled to said resistance means, said output means responsive to the conduction of said controlled rectifiers; and, a combination heat sink and a low inductance circuit comprising means for mounting said plurality of controlled rectifiers and being constructed of a material having high heat and electrical conductivities, a plurality of magnetic isolating arms each projecting from said means for mounting, said capacitive means including a plurality of parallel connected capacitors surrounding said means for mounting in a coaxial manner and having their magnetic fields isolated by said isolating arms.

7. An inverter circuit for providing A.C. power from a D.C. source, said inverter circuit comprising:
means connected to the D.C. source for providing commutating-current isolation;
a pair of switch means each having an anode, a cathode and a control electrode the anodes of such switch means connected in parallel with each other and in series with said isolation means;
each of said switch means coupled to a pulse generating means, said generating means being coupled across the D.C. source and providing a source of actuating signals to alternately initiate conduction of each of said switch means;
a pair of reactive load current feedback means, each of said means connected in parallel with the series combinations formed by said isolation means and each of said switch means;
a commutating capacitor connected across the cathodes of said switch means;
voltage regulating means for converting the signal produced by the alternate conduction of the switch means to an A.C. signal;
means connected between each end of said voltage regulating means and the cathode of each of said switch means for providing current surge protection, for insuring the charging of said commutating capacitor and for permitting the circuit to purge itself of residual flux;
shorting means connected across each of said protection means; and
means connected across the D.C. source for closing said shorting means after sufficient time has elapsed to allow the inverter circuit to purge itself of residual flux, thereby allowing the regulating means to supply full voltage to a load.

8. A D.C. to A.C. inverter circuit for providing a source of standby A.C. power from a D.C. source having positive and negative terminals, said inverter circuit comprising:
an inductor connected in series with one of the terminals of the D.C. source for providing isolation of the commutating current;
a pair of controlled rectifiers each having an anode, a cathode and a control-electrode, the anodes of said rectifiers connected in parallel with each other and in series with said inductor;
each of said control electrodes connected to a pulse generator, said generator being coupled across the D.C. source and provides a source of square wave actuating signals to alternately initiate conduction of each of said controlled rectifiers;
two diodes each having an anode and a cathode, each of said cathodes of said diodes electrically connected in parallel with each other and in series with said one terminal of the D.C. source, each of said anodes of said diodes connected to the cathode of one of said rectifiers;
a commutating capacitor connected across the cathodes of said rectifiers;
a controlled voltage regulator for converting the square wave produced by the alternate conduction of the controlled rectifiers to an A.C. signal;
two resistors, one of which is connected between one end of the voltage regulator and the cathode of one of said rectifiers and the other of which is connected between the other end of the voltage regulator and the cathode of the other of said rectifiers, said resistors providing current surge protection, insuring the charging of said commutating capacitor and providing means to permit the circuit to purge itself of residual flux;
a shunting contact connected across each of said resistors; and
means connected across the D.C. source for shorting said contacts after sufficient time has elapsed to allow the inverter circuit to purge itself of residual flux, thereby allowing the regulator to supply full voltage to a load.

9. An inverter circuit as set forth in claim 8 wherein:
said pulse generator includes a transformer having a primary winding and a pair of secondary windings, each of said secondary windings has a diode-delay winding parallel combination in series therewith to chop off a portion of the leading edge of the square wave pulse so as to provide a proper turn-on signal to the appropriate rectifier, said secondary windings are each coupled to one of the control gates of each of the rectifiers.

10. A inverter circuit as set forth in claim 8 wherein:
said regulator includes a transformer having a primary winding and a secondary winding, said primary winding has a center tap connected to the other terminal of the D.C. power source, said secondary winding is coupled to a load.

11. An inverter as set forth in claim 8 wherein:
said means for shorting said contacts includes a timing circuit having a core and winding connected thereto for initiating the shorting of said contacts.

12. A D.C. to A.C. inverter circuit for providing a source of standby A.C. power from a D.C. source, said inverter comprising:
a D.C. power source having positive and negative terminals;
an inductor connected in series with one of the terminals of the D.C. source for providing isolation of the commutating current;
a pair of silicon controlled rectifiers each having an anode, a cathode and a control electrode, the anodes of said rectifiers connected in parallel with each other and in series with said inductor;
each of said control electrodes connected to pulse generator, said generator being coupled across the D.C. source and provides a source of square wave actuating signals to alternately initiate conduction of each of said controlled rectifiers, said pulse generator including a transformer having a primary winding and a pair of secondary windings, each of said secondary windings having a diode-delay winding parallel combination in series therewith to chop off a portion of the leading edge of the square wave pulse so as to provide a proper turn-on signal to the appropriate rectifier, said secondary windings each being coupled to one of the control gates of each of the rectifiers;
two diodes each having an anode and a cathode, each of said cathodes of said diodes electrically connected in parallel with each other and in series with said one terminal of the D.C. source, each of said anodes of said diodes connected to the cathode of one of said rectifiers;

a commutating capacitor connected across the cathodes of said rectifiers;

a controlled voltage regulator for converting the square wave produced by the alternate conduction of the controlled rectifiers to an A.C. signal;

said regulator including a transformer having a primary winding and a secondary winding, said primary winding having a center tap connected to the other terminal of the D.C. power source, said secondary winding being coupled to a load;

two resistors one of which is connected between one end of the voltage regulator and the cathode of one of said rectifiers and the other of which is connected between the other end of the voltage regulator and the cathode of the other of said rectifiers, said resistors providing current surge protection, insuring the charging of said commutating capacitor and providing means to permit the circuit to purge itself of residual flux;

a shunting contact connected across each of said resistors; and means connected across the D.C. source for shorting said contacts after sufficient time has elapsed to allow the inverter circuit to surge itself of residual flux, thereby allowing the regulator to supply full voltage to a load, said means for shorting said contacts including a timing circuit having a core and winding connected thereto for initiating the shorting of said contacts.

References Cited
UNITED STATES PATENTS

| | | | |
|---|---|---|---|
| 2,923,869 | 2/1960 | Parrish | 317—99 XR |
| 3,030,553 | 4/1962 | Comuntzis | 317—100 |
| 3,070,759 | 12/1962 | Brouwer | 333—113 |
| 3,188,549 | 6/1965 | Schuler | 321—27 |
| 3,213,352 | 10/1965 | Faith | 321—45 |
| 3,264,548 | 8/1966 | King | 321—45 |
| 3,133,241 | 5/1964 | White | 321—45 |
| 3,082,369 | 3/1963 | Landis | 321—45 |
| 2,994,806 | 8/1961 | McLaughlin | 317—99 |
| 2,596,237 | 5/1952 | Gross et al. | 317—99 |

JOHN F. COUCH, *Primary Examiner.*

WM. SHOOP, *Assistant Examiner.*